United States Patent
Kato et al.

(10) Patent No.: US 12,439,281 B2
(45) Date of Patent: Oct. 7, 2025

(54) APPARATUS MAINTENANCE MANAGEMENT SYSTEM

(71) Applicant: Mitsubishi Electric Corporation, Tokyo (JP)

(72) Inventors: Shun Kato, Tokyo (JP); Hirotoshi Yano, Tokyo (JP); Masanori Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 495 days.

(21) Appl. No.: 18/002,715

(22) PCT Filed: Aug. 27, 2020

(86) PCT No.: PCT/JP2020/032286
§ 371 (c)(1),
(2) Date: Dec. 21, 2022

(87) PCT Pub. No.: WO2022/044178
PCT Pub. Date: Mar. 3, 2022

(65) Prior Publication Data
US 2023/0247448 A1     Aug. 3, 2023

(51) Int. Cl.
*H04W 24/04* (2009.01)
*H04W 12/0431* (2021.01)
(Continued)

(52) U.S. Cl.
CPC ....... *H04W 24/04* (2013.01); *H04W 12/0431* (2021.01); *H04W 12/06* (2013.01); *H04W 84/20* (2013.01)

(58) Field of Classification Search
CPC . H04W 24/04; H04W 12/0431; H04W 12/06; H04W 84/20
(Continued)

(56) References Cited

U.S. PATENT DOCUMENTS

| | | | |
|---|---|---|---|
| 2008/0175390 A1* | 7/2008 | Alessio | G06Q 20/353 380/278 |
| 2010/0302974 A1* | 12/2010 | Niiyama | G07C 5/0808 370/254 |
| 2015/0107316 A1* | 4/2015 | Kirkjan | G07C 9/00182 |

FOREIGN PATENT DOCUMENTS

| | | |
|---|---|---|
| JP | 2015-182561 A | 10/2015 |
| JP | 2016-161215 A | 9/2016 |

(Continued)

OTHER PUBLICATIONS

Office Action dated Apr. 30, 2025 issued in corresponding CN Patent Application No. 202080103289.3 (and English translation).
(Continued)

*Primary Examiner* — Hermon Asres
(74) *Attorney, Agent, or Firm* — Posz Law Group, PLC

(57) ABSTRACT

An apparatus maintenance management system includes a plurality of apparatuses each configured to transmit information on its own operation and information on the presence or absence of an abnormality, and a remote processor configured to acquire and store the information of each of the apparatuses. The remote processor is configured to restrict communication by using authentication keys of at least one type having a master-slave relationship, and perform communication with, as a communication partner, each of a first communication device to which one of the authentication keys that functions as a master for at least one of the apparatuses is given in advance and a second communication device to which another one of the authentication keys that functions as a slave for the first communication device is given in advance. When performing communication, the remote processor determines a range of the information to be provided to the communication partner according to the type and the master-slave relationship of the authentication key that the communication partner has.

7 Claims, 10 Drawing Sheets

(51) Int. Cl.
*H04W 12/06* (2021.01)
*H04W 84/20* (2009.01)

(58) Field of Classification Search
USPC .......................................... 370/216
See application file for complete search history.

(56) References Cited

FOREIGN PATENT DOCUMENTS

| JP | 2018-073114 A | 5/2018 |
| WO | 2017/047721 A1 | 3/2017 |

OTHER PUBLICATIONS

International Search Report of the International Searching Authority mailed Nov. 24, 2020 in corresponding International Application No. PCT/JP2020/032286 (and English translation).

* cited by examiner

|  | 3a | 3b | 4 |
|---|---|---|---|
| 1a | MASTER | — | SLAVE |
| 1b | — | MASTER | SLAVE |

81

|  | INFORMATION A | INFORMATION B | INFORMATION C |
|---|---|---|---|
| MASTER | ACQUISITION ALLOWED | ACQUISITION ALLOWED | ACQUISITION ALLOWED |
| SLAVE | × | × | ACQUISITION ALLOWED |
| — | × | × | × |

82

| | 4 | 5 | 6 | 81 |
|---|---|---|---|---|
| 1 | MASTER/ SLAVE (1) | SLAVE (2) | MASTER (0) | |

| | INFOR- MATION A | INFOR- MATION B | INFOR- MATION C |
|---|---|---|---|
| MASTER (0) | ACQUISITION ALLOWED | ACQUISITION ALLOWED | ACQUISITION ALLOWED |
| MASTER/ SLAVE (1) | × | ACQUISITION ALLOWED | ACQUISITION ALLOWED |
| SLAVE (2) | × | × | ACQUISITION ALLOWED |

82

|  | SWITCHING | REPLACE-MENT |
|---|---|---|
| 1a | DENY | DENY |
| 1b | ALLOW | ALLOW |

83

| AUTHENTICA-TION KEY 30 | OWNER 3 | SEARCH CODE SS1 | SEARCH CODE SS2 | ... | INFOR-MATION D1 | INFOR-MATION D2 | ... |
|---|---|---|---|---|---|---|---|
| 30a | 3a1 | 33a | 33(1)a | ... | 100a(1) | 100b(1) | ... |
| 30b | 3a2 | 33a | 33(2)a | ... | 100a(2) | 100b(2) | ... |
| 30c | 3a3 | 33a | 33(3)a | ... | 100a(3) | 100b(3) | ... |
| 30d | 3b1 | 33b | 33(1)a | ... | 100a(4) | 100b(4) | ... |
| 30e | 3b2 | 33b | 33(2)a | ... | 100a(5) | 100b(5) | ... |

APPARATUS MAINTENANCE MANAGEMENT SYSTEM

CROSS REFERENCE TO RELATED APPLICATION

This application is a U.S. national stage application of International Patent Application No. PCT/JP2020/032286 filed on Aug. 27, 2020, the disclosure of which is incorporated herein by reference.

TECHNICAL FIELD

The present disclosure relates to an apparatus maintenance management system that is equipped with a remote processor collecting information of a plurality of apparatuses.

BACKGROUND

Conventionally, apparatus maintenance management systems centrally manage information of a plurality of apparatuses (for example, air-conditioning apparatuses) at management centers, and perform repair or replacement before a failure occurs in the apparatuses. Such systems includes an apparatus maintenance management system that acquires data on power consumption or power waveform of a plurality of apparatuses installed in more than one buildings via a server that provides a cloud service (see, for example, Patent Literature 1). The server of the apparatus maintenance management system disclosed in Patent Literature 1 evaluates a deterioration state of each apparatus based on data acquired for the apparatus and sets a priority for repair or replacement for the apparatus.

PATENT LITERATURE

Patent Literature 1: International Publication No. 2017/047721

In the apparatus maintenance management system disclosed in Patent Literature 1, the information of a plurality of apparatuses is centrally managed by the management center. Consequently, there is a possibility that a user that uses information of a certain apparatus, such as a user or a maintenance person of that apparatus, can access information of other apparatuses. Therefore, the apparatus maintenance management system disclosed in Patent Literature 1 has a problem that the security of information cannot be ensured.

SUMMARY

The present disclosure has been made to overcome the above-mentioned problem, and has an object to provide an apparatus maintenance management system capable of providing a user who uses information of a certain apparatus with necessary information while ensuring the security of information.

An apparatus maintenance management system according to an embodiment of the present disclosure includes a plurality of apparatuses each configured to transmit information on its own operation and information on the presence or absence of an abnormality, and a remote processor configured to acquire and store the information of each of the apparatuses. The remote processor is configured to restrict communication by using authentication keys of at least one type having a master-slave relationship, and perform communication with, as a communication partner, each of a first communication device to which one of the authentication keys that functions as a master for at least one of the apparatuses is given in advance and a second communication device to which another one of the authentication keys that functions as a slave for the first communication device is given in advance. When performing communication, the remote processor determines a range of the information to be provided to the communication partner according to the type and the master-slave relationship of the authentication key that the communication partner has.

According to an embodiment of the present disclosure, a target apparatus whose information is provided to a communication partner and the level of disclosure of the information can be changed according to the type of the authentication key that the communication partner of the remote processor has, the presence/absence of a specific authentication key, and the master-slave relationship of the authentication key. Thus, necessary information can be provided to the communication partner while the security of information is ensured.

DETAILED DESCRIPTION

Embodiment 1

Figure 1:
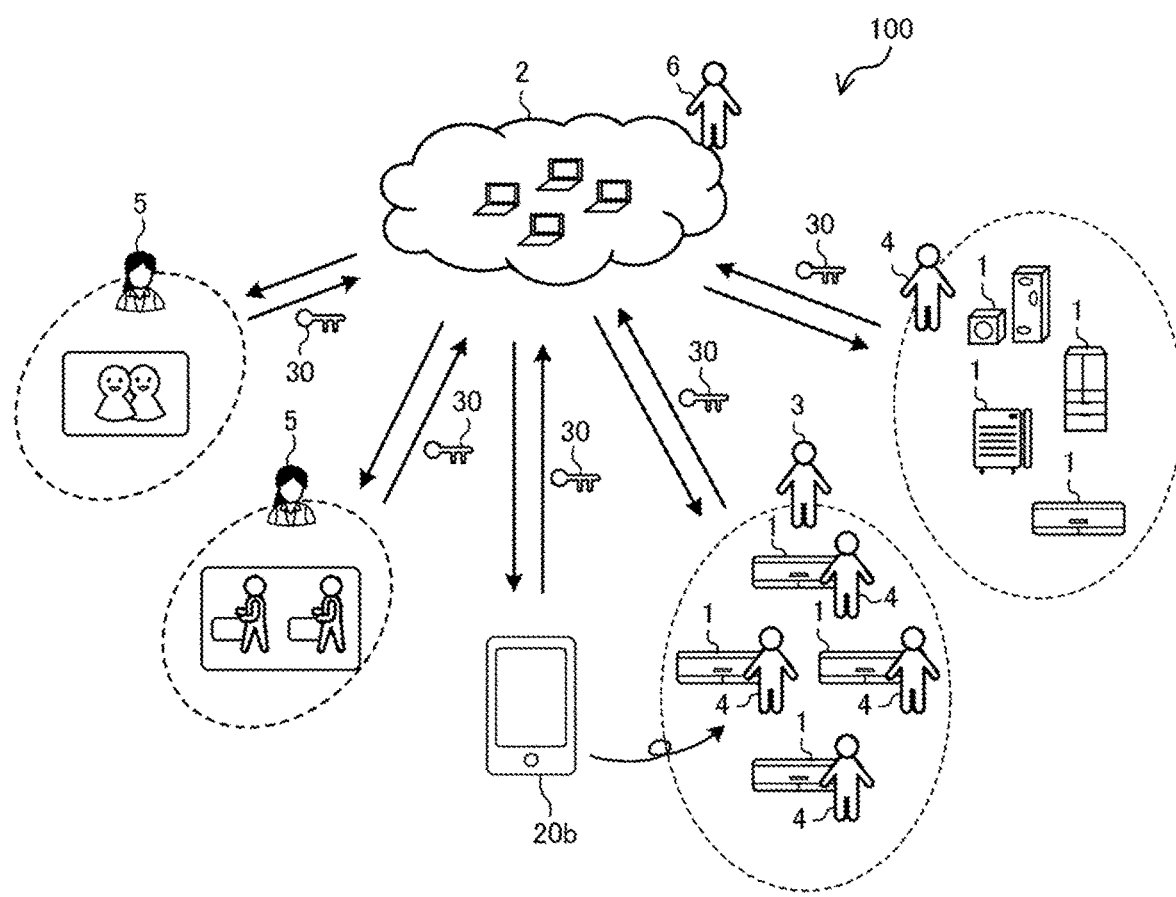
FIG. 1 is a schematic configuration diagram illustrating an apparatus maintenance management system according to Embodiment 1.

FIG. 1 is a schematic configuration diagram illustrating an apparatus maintenance management system according to Embodiment 1. An apparatus maintenance management system 100 is configured to collect information of a plurality of apparatuses 1, which are installed, for example, at stores of a convenience store chain or in a commercial building having a wide range of facilities, and provide the collected information under a certain condition. As shown in FIG. 1, the apparatus maintenance management system 100 includes a plurality of apparatuses 1 and a remote processor 2, such as a cloud server. With reference to FIG. 1, a schematic configuration of the apparatus maintenance management system 100 will be described.

Each of the apparatuses 1 is, for example, a home appliance, such as a room air-conditioner, a water heater, a television, or a refrigerator, or a commercial apparatus, such as a commercial air-conditioning apparatus or a chiller. In the example shown in FIG. 1, the apparatus maintenance management system 100 includes apparatuses 1 of a plurality of types, such as a room air-conditioner and a water heater. Note that the apparatus maintenance management system 100 may include apparatuses of a single type.

Each apparatus 1 includes communication means and is configured to perform a periodical communication, which transmits data to the remote processor 2 at every predetermined time. The apparatus 1 is also configured to perform communication in response to a request from the outside, such as the remote processor 2 or a communication device 20b (for example, a smartphone). More specifically, the apparatus 1 transmits information on its own operation and on abnormalities to the remote processor 2. The communication means of the apparatus 1 is a communication interface that performs a wireless communication according to a standard, such as Wireless Fidelity (Wi-Fi), Long Term Evolution (LTE), 5th generation (5G), or Bluetooth (registered trademark). Note that, the communication means of the apparatus 1 is not limited to the abovementioned interface, and may be, for example, a telephone line, such as an asymmetric digital subscriber line (ADSL), a wired local area network (LAN), or a programmable logic controller (PLC).

The remote processor 2 is configured to collect information of the apparatus 1, and analyze and provide the collected information. The remote processor 2 is formed as, for example, a cloud server providing a cloud service. More specifically, the remote processor 2 is formed by a single computer or a plurality of computers. It is preferable that the number of the computers forming the remote processor 2 be determined based on the required arithmetic processing capacity and the required communication load.

The remote processor 2 communicates with the plurality of apparatuses 1 and collects information of each of the apparatuses 1. The information of the apparatus 1 includes, for example, operation information of the apparatus 1 and information on the presence or absence of abnormality in the apparatus 1. In addition, the remote processor 2 communicates with a communication device 20a (FIG. 6), which is owned by an administrator 6 of the remote processor 2, to transmit thereto the information of the plurality of apparatuses 1. The remote processor 2 also communicates with a communication device 20b owned by an owner 3 of at least one (one or more than one) apparatus 1 and with a communication device 20b owned by a user 4 of at least one (one or more than one) apparatus 1, and discloses collected information on the plurality of apparatuses 1 to an information receiver 5, such as a maintenance provider or a service provider, under a certain restriction.

The remote processor 2 has an authentication function, and thereby discloses information collected from the apparatuses 1 to a communication partner, such as the administrator 6 of the remote processor 2, the user 4 of the apparatus 1, the owner 3 of the apparatus 1, or the information receiver 5, according to an authentication key 30 that the communication partner has. The authentication performed by the remote processor 2 uses authentication keys 30 having a master-slave relationship. A range of the information to be provided, such as which apparatus 1 the information to be disclosed and the level of disclosure of the information, is determined based on the type of the authentication key 30 previously given to each communication partner of the remote processor 2 and the master-slave relationship thereof. The remote processor 2 stores information on the administrator 6 of the remote processor 2, the user 4 of each apparatus 1, the owner 3 of each apparatus 1, and the information receiver 5. When storing information on the administrator 6 of the remote processor 2, the user 4 of each apparatus 1, the owner 3 of each apparatus 1 and the information receiver 5, the remote processor 2 gives the authentication key 30 to each of them.

The remote processor 2 analyzes the information collected from each apparatus 1, and transmits, to the apparatus 1, a command for interrupting the operation, resuming the operation, or bringing the operation to an emergency stop according to the analysis result. For example, when the remote processor 2 analyzes the information of a specific apparatus 1 and determines that a failure or malfunction is present in the apparatus 1, the remote processor 2 transmits to the apparatus 1a command for stopping its operation.

The owner 3 is a person who owns an apparatus 1, and does not have to stay at the installation location of the apparatus 1. The owner 3 may own more than one apparatus 1. In the example shown in FIG. 1, the owner 3 owns four apparatuses 1.

The user 4 is a person who uses an apparatus 1, and may be the same person as the owner 3. In addition, the user 4 may be a user of multiple apparatuses 1 owned by more than one owner 3.

The information receiver 5 is a vendor, such as a maintenance provider or a service provider, that acquires information on the apparatuses 1 from the remote processor 2 and utilizes the information. The maintenance provider is a provider that performs maintenance and checkup of the apparatuses 1. The service provider is a provider that links the apparatuses 1 with a service (for example, a management service for power consumption or a life support service related to health) of the service provider based on the information on the apparatuses 1. The maintenance provider or the service provider may be a self-employed person, such as a gig worker.

In the present disclosure, the communication device 20a or the communication device 20b to which the authentication key 30 functioning as the master for at least one apparatus 1 is previously given is referred to as a first communication device, and the communication device 20a or the communication device 20b to which the authentication key 30 functioning as the slave for the first communication device is previously given is referred to as a second communication device. That is, even when the authentication keys 30 of the same type are assigned to the first communication device and the second communication device, the first communication device has a higher authority level than the second communication device.

In general, a higher authority level is given to the administrator 6 of the remote processor 2 and the owner 3 of an apparatus 1, compared to the user 4 of the apparatus 1 and the information receiver 5. In this case, the communication device 20a owned by the administrator 6 and the communication device 20b owned by the owner 3 can be defined as the first communication devices, and the communication device 20b owned by the user 4 and the communication device 20b owned by the information receiver 5 can be defined as the second communication devices.

In the meantime, when the user 4 of the apparatus 1 uses the apparatus 1 for a long time, there is a concern that a life rhythm or consumption behavior of the user 4 is revealed from the information of the apparatus 1. Disclosure of specific information to the owner 3 of the apparatus 1 or the administrator 6 of the remote processor 2 is not preferred in some cases. Even in such a case, disclosure of the information to the information receiver 5 may be required for maintenance. In the embodiments of the present disclosure, because the range of the information to be provided is determined by using the authentication keys 30 having a master-slave relationship in communication, it is possible to give a higher authority level to the user 4 of the apparatus 1 than the owner 3 by using the master-slave relationship of the authentication keys 30.

Each authentication key 30 has a master-slave relationship. By using the authentication key 30 in communication, the communication is restricted according to the type and the master-slave relationship of the authentication key 30. More specifically, the communication between each apparatus 1 and the remote processor 2, the communication between the remote processor 2 and the communication device 20b owned by the information receiver 5, the owner 3, or the user 4, and the communication between the remote processor 2 and the communication device 20a owned by the administrator 6 are each restricted according to the corresponding authentication key 30. Note that, the communication device 20a and the communication device 20b may communicate directly with each other, and the communication device 20a, 20b may communicate directly with each apparatus 1.

The master-slave relationship is a relationship in which the authority given for the authentication key 30 functioning as the master includes all privileges given to the authentication key 30 functioning as the slave. The authentication keys 30 having the master-slave relationship forms a master-slave configuration in which the level of disclosure and the authority given to the master is different from those given to the slave. In the description below, the authentication key 30 functioning as the master is referred to as a master key and the authentication key functioning as the slave is referred to as a slave key in some cases. In addition, a person who has the authentication key 30 functioning as the master is referred to as a master key owner and a person who has the authentication key 30 functioning as the slave is referred to as a slave key owner in some cases.

Figure 2:
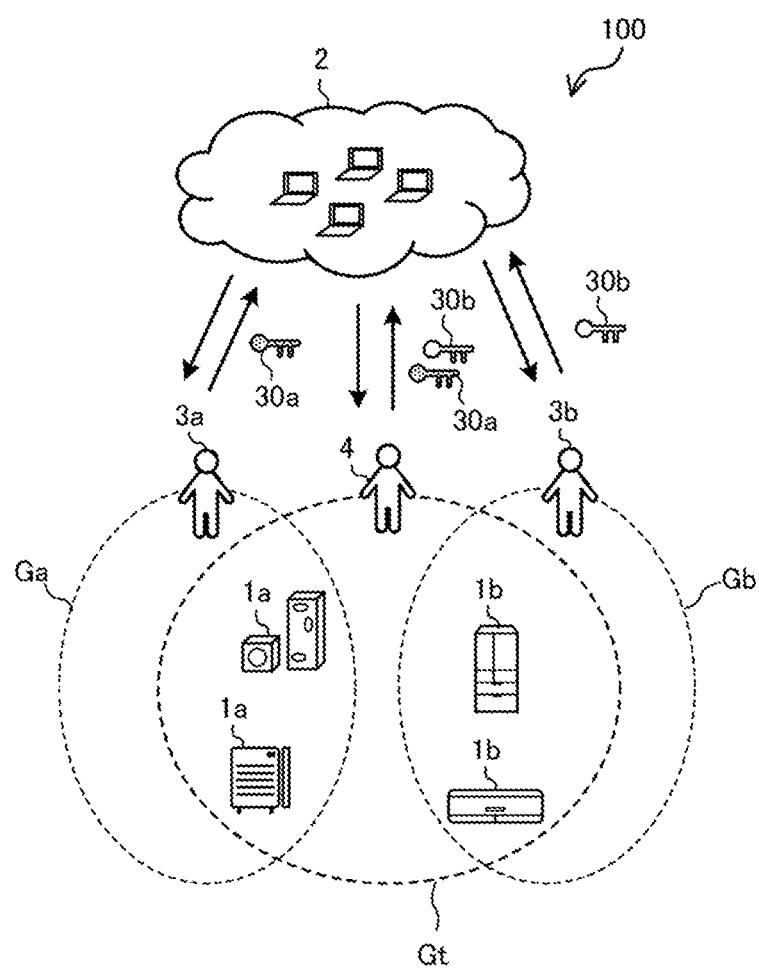
FIG. 2 is a diagram illustrating an example of the apparatus maintenance management system according to Embodiment 1.

FIG. 2 is a diagram illustrating an example of the apparatus maintenance management system according to Embodiment 1. In the example shown in FIG. 2, an owner 3a owns an apparatus group Ga consisting of two apparatuses 1a, an owner 3b owns an apparatus group Gb consisting of two apparatuses 1b, and the user 4 uses the four apparatuses 1a and 1b included in an apparatus group Gt consisting of the apparatus groups Ga and Gb. As shown in FIG. 2, an authentication key 30a having a master-slave relationship is previously given to each of the owner 3a and the user 4, and an authentication key 30b having a master-slave relationship is previously given to each of the owner 3b and the user 4.

Figure 3:
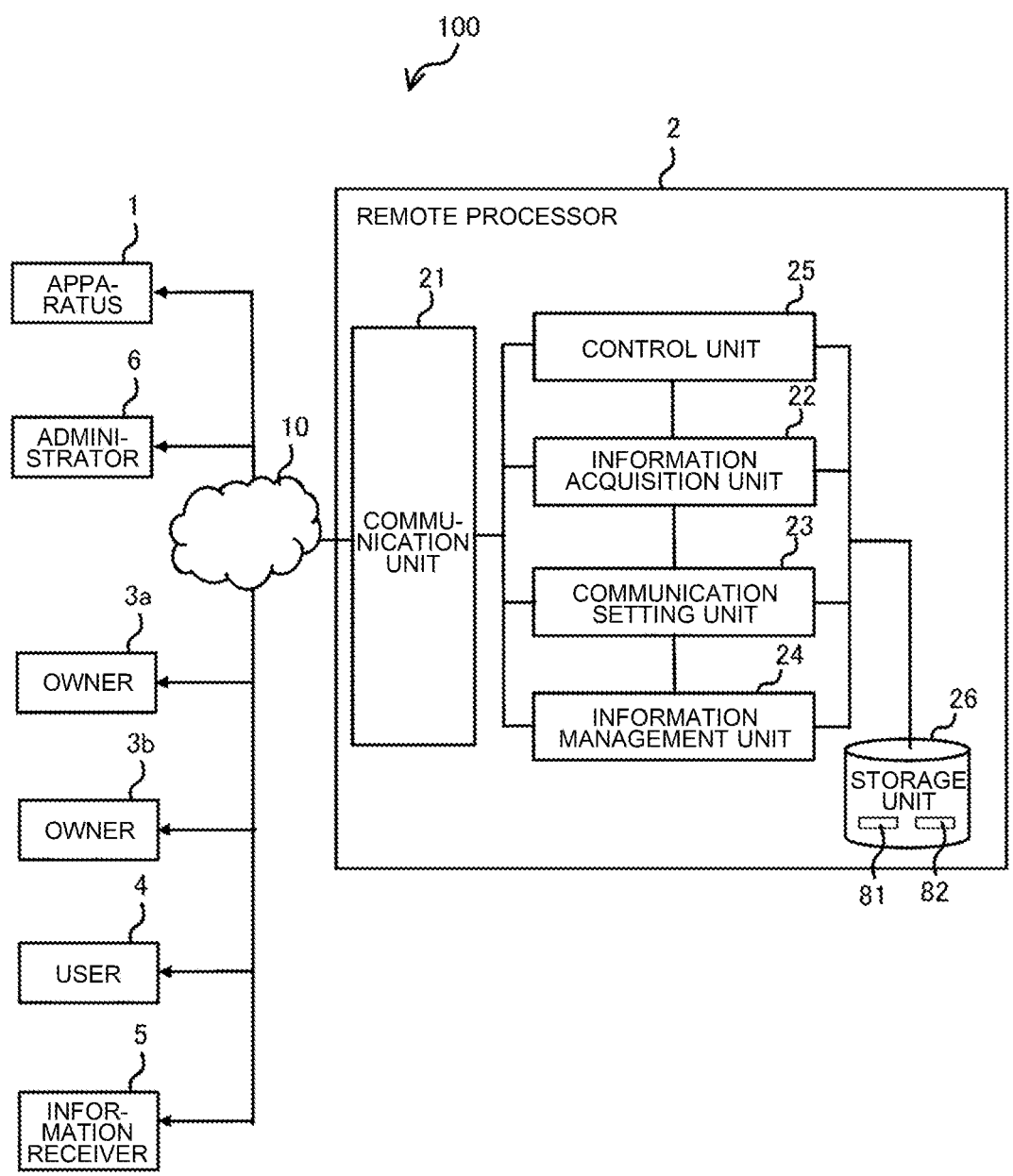
FIG. 3 is a functional block diagram illustrating functions of a remote processor of the apparatus maintenance management system according to Embodiment 1.

FIG. 3 is a functional block diagram illustrating functions of a remote processor of the apparatus maintenance management system according to Embodiment 1. As shown in FIG. 3, the remote processor 2 includes a communication unit 21, an information acquisition unit 22, a communication setting unit 23, an information management unit 24, a control unit 25, and a storage unit 26.

The remote processor 2 is dedicated hardware or a central processing unit (CPU) that executes a program stored in a memory. Note that, the CPU is also called central processor, processing device, arithmetic device, microprocessor, microcomputer, or processor.

When the remote processor 2 is a dedicated hardware, the remote processor 2 corresponds to, for example, a single circuit, a composite circuit, an application specific integrated circuit (ASIC), a field-programmable gate array (FPGA), or a combination of these circuits. The functional units implemented by the remote processor 2 may be achieved by individual pieces of hardware or a single piece of hardware.

When the remote processor 2 is the CPU, each function executed by the remote processor 2 is achieved by software, firmware, or a combination of software and firmware. The software or the firmware is described as a program and is stored in the memory. The CPU is configured to read out and execute the program stored in the memory, to thereby achieve each of the functions of the remote processor 2. The memory is, for example, a random access memory (RAM), a read-only memory (ROM), a flash memory, an erasable programmable read-only memory (EPROM), an electrically erasable programmable read-only memory (EEPROM), or another type of non-volatile or volatile semiconductor memory.

Some of the functions of the remote processor 2 may be achieved by dedicated hardware, and some other functions may be achieved by software or firmware.

Based on FIG. 3, the communication unit 21, the information acquisition unit 22, the communication setting unit 23, the information management unit 24, the control unit 25, and the storage unit 26, which are the function units of the remote processor 2, will be described. The control unit 25 is configured to control operations of the information acquisition unit 22, the communication setting unit 23, and the information management unit 24. The control unit 25 is also configured to analyze the information on the plurality of apparatuses 1 and transmit a command to the corresponding apparatus 1 according to the analysis result.

The communication unit 21 is connected to each of the apparatuses 1 via a network 10, such as the Internet, to perform transmission and reception of data. Similarly, the communication unit 21 is connected to the communication device 20b (not shown) of the owner 3a of the apparatus group Ga (FIG. 2) and to the communication device 20b (not shown) of the owner 3b of the apparatus group Gb (FIG. 2) via the network 10 to perform transmission and reception of data. The communication unit 21 is connected also to the communication device 20b (FIG. 1) owned by the user 4 of the apparatus group Gt (FIG. 2) via the network 10 to perform transmission and reception of data. Furthermore, the communication unit 21 is connected to the communication device 20a (FIG. 6) owned by the administrator 6 of the remote processor 2 via the network 10 to perform transmission and reception of data. Note that, in FIG. 3, the communication device 20a and the communication devices 20b are omitted for explanation, and the communication partners of the remote processor 2 are indicated as the owner 3a, the owner 3b, the user 4, the information receiver 5, and the administrator 6, who are the owners of those communication devices.

The information acquisition unit 22 is configured to acquire information of the plurality of apparatuses 1. The information acquisition unit 22 receives, via the communication unit 21, information of each apparatus 1, which is transmitted from the apparatus 1 at a predetermined timing. Note that, the information acquisition unit 22 may be configured to transmit, to each apparatus 1, a request for transmission of information of the apparatus 1 at a predetermined timing, and receive the information transmitted from the apparatus 1 upon request. The information of the plurality of apparatuses 1 received by the information acquisition unit 22 is stored in the storage unit 26.

The communication setting unit 23 is configured to set or change a restriction on communication based on a setting request received from the outside. The storage unit 26 stores a restriction on communication for each communication partner.

The information management unit 24 is configured to manage data to be transmitted and received in communication with the outside. For example, when receiving a request for information disclosure from one communication partner, the information management unit 24 determines a range of the information to be disclosed based on the authentication key 30a, 30b (FIG. 2) of the communication partner. When determining a range of the information to be disclosed based on the authentication key 30a, 30b (FIG. 2), the information management unit 24 refers to settings previously stored in the storage unit 26. The information management unit 24 extracts the information of the determined range from the storage unit 26 and transmits the information to the communication partner via the communication unit 21.

In the storage unit 26, the information of the plurality of apparatuses 1 acquired by the information acquisition unit 22 is stored for each of the apparatuses 1. In addition, a first restriction table 81 and a second restriction table 82 in each of which restrictions are defined are stored in the storage unit 26.

Figures 4, 5, 6:
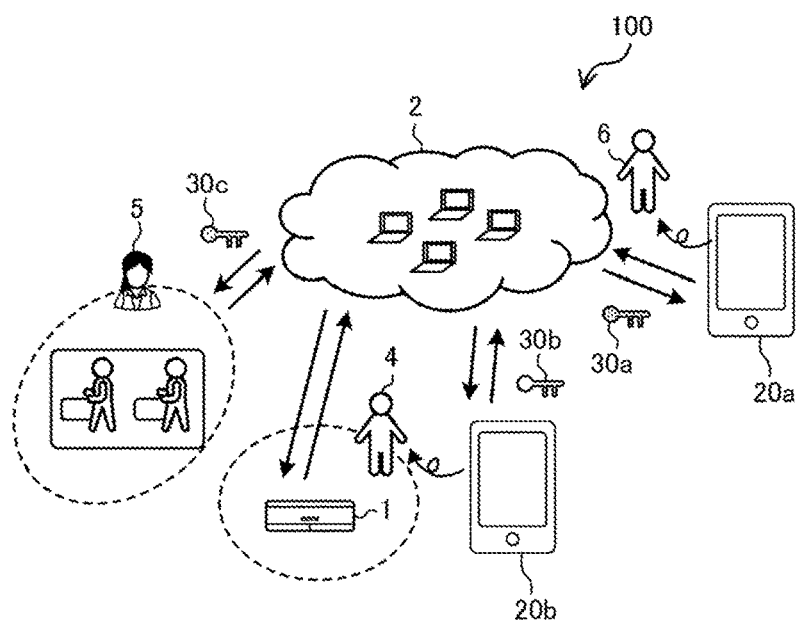
FIG. 4 is a diagram illustrating a relationship between the authentication keys that the owners and the user have and the apparatuses in the example of FIG. 2.
FIG. 5 is a diagram illustrating a range of the information that can be acquired by using each authentication key in the example of FIG. 2.
FIG. 6 is a diagram illustrating an example of the apparatus maintenance management system according to Embodiment 2.

FIG. 4 is a diagram illustrating a relationship between the authentication keys that the owners and the user have and the apparatuses in the example of FIG. 2. The owner 3a is a master key owner of the authentication key 30a (FIG. 2) given for the apparatuses 1a, and is the master for the apparatuses 1a. The owner 3b is a master key owner of the authentication key 30b (FIG. 2) given for the apparatuses 1b, and is the master for the apparatuses 1b. The user 4 is the slave key owner of each of the two authentication keys 30a and 30b (FIG. 2), and has a lower authority than the owner 3a for the apparatuses 1a and has a lower authority than the owner 3b for the apparatuses 1b. Such a relationship between the master/slave key owners and the apparatuses 1 whose information is to be disclosed is defined in the first restriction table 81.

FIG. 5 is a diagram illustrating a range of the information that can be acquired by using each authentication key in the example of FIG. 2. In the description below, suppose that the information of each apparatus 1 includes a plurality of information items A to C. For the master key of the authentication key 30a (FIG. 2), acquisition of all of the information items A to C of the apparatuses 1a is allowed. For the slave key of the authentication key 30a (FIG. 2), acquisition of only the information item C, among the information items A to C, of the apparatuses 1a is allowed. Furthermore, for the master key of the authentication key 30b (FIG. 2), acquisition of all of the information items A to C of the apparatuses 1b is allowed. For the slave key of the authentication key 30b (FIG. 2), acquisition of only the information item C, among the information items A to C, of the apparatuses 1b is allowed. Such a relationship between the master/slave key and the disclosure level of information is defined in the second restriction table 82.

Next, with reference to FIGS. 2 and 3, operation of the apparatus maintenance management system 100 will be described. As shown in FIG. 3, the apparatus 1 periodically transmits the information on its own operation and the information on abnormalities to the remote processor 2. In addition to the periodical communication, the apparatus 1 transmits its own information based on a request from the remote processor 2, the owner 3a, 3b, the user 4, the information receiver 5, or the administrator 6. Furthermore, the apparatus 1 interrupts or resumes its operation, or brings the operation to an emergency stop based on its own information or a command received from the remote processor 2.

The remote processor 2 collects information of the plurality of apparatuses 1 connected therewith via the network. In addition, as shown in FIG. 2, the remote processor 2 transmits the collected information of the apparatuses 1 to the owner 3a, 3b and the user 4 based on the authentication key 30a, 30b.

The remote processor 2 transmits all of the information items A to C of the apparatus 1a to the owner 3a who owns the master key of the authentication key 30a. Meanwhile, the remote processor 2 does not transmit the information of the apparatus 1a to the owner 3b who does not own the authentication key 30a. In addition, the remote processor 2 transmits all of the information items A to C of the apparatus 1b to the owner 3b who owns the master key of the authentication key 30b. Meanwhile, the remote processor 2 does not transmit the information of the apparatus 1b to the owner 3a who does not own the authentication key 30b. Furthermore, the remote processor 2 transmits only the information item C of the apparatus 1a and the information item C of the apparatus 1b to the user 4 who owns the slave keys of the authentication key 30a and the authentication key 30b.

Note that, as shown in FIG. 1, when each information receiver 5 is provided with an authentication key 30, the information receiver 5 can acquire information of the apparatuses 1 according to the authentication key 30 of the information receiver 5, and can thus provide a service, such as a maintenance service, based on the acquired information. Furthermore, the second restriction table 82 shown in FIG. 5 is a mere example, and the type and the number of the information items (for example, information items A to C) whose disclosure is restricted are not limited. The personal information of the users 4 or the owner 3 of the apparatuses 1 shown in FIG. 1 may be subject to restriction.

Although a case where the owner 3a and the owner 3b are the master key owners and the user 4 is the slave keys owner has been described above based on FIG. 2, a combination of master key owners and slave key owners is not particularly limited to the above-described combination. As shown in FIG. 1, it is preferred that the type and the subordination of the authentication key 30 to be given be determined according to the type of apparatuses 1 or a demand of the user 4. For example, in FIG. 2, the user 4 may be the master keys owner and the owners 3a and 3b may be slave key owners. Furthermore, for the apparatus group Ga owned by the owner 3a, the owner 3a may be the master key owner of the authentication key 30a, and the information receiver 5 may be the slave key owner of the authentication key 30a, for example. For the apparatus group Gt that the user 4 uses, the user 4 may be the master keys owner of the authentication keys 30a and 30b, and the information receiver 5 may be the slave keys owner of the authentication keys 30a and 30b, for example. Moreover, for the apparatus group Gt whose information is collected by the remote processor 2 that the administrator 6 manages, each of the owners 3 may be the slave key owner of the corresponding authentication key 30a, 30b, or the user 4 or the information receiver 5 may be the slave keys owner of the authentication keys 30a and 30b.

As described above, the apparatus maintenance management system 100 according to Embodiment 1 includes the plurality of apparatuses 1 each configured to transmit information on its own operation and abnormalities, and the remote processor 2 configured to acquire and store the information of each of the apparatuses 1. The remote processor 2 is configured to restrict communication by using at least one type of authentication key 30 having a master-slave relationship. The remote processor 2 communicates with, as a communication partner, each of the first communication device to which the authentication key 30a functioning as the master for the apparatuses 1a, which are at least one of the apparatuses 1, is previously given and the second communication device to which the authentication key 30a functioning as the slave for the first communication device is previously given. When performing communication, the remote processor 2 determines a range of the information to be provided according to the type and the master-slave relationship of the authentication key 30 that each communication partner has.

With this configuration, according to the type of the authentication key 30 that each communication partner of the remote processor 2 has, the presence/absence of a specific authentication key 30, and the master-slave relationship of the authentication key 30, a target apparatus whose information is provided to the communication partner and the level of disclosure of the information can be changed. Thus, necessary information can be provided to the communication partner while the security of information is ensured.

Furthermore, the first communication device and the second communication device include at least two communication devices of the communication device 20a owned by the administrator 6 and the communication devices 20a owned by the owners 3 of some of the apparatuses 1, the users 4, or the maintenance provider (information receiver 5).

With this configuration, compared with a conventional configuration in which setting is not individualized for each communication partner, setting of providing suitable information to each communication partner can be achieved more flexibly by giving authentication keys 30 to two or more communication partners. For example, in a commercial establishment where multiple facilities are present in one building, there is a plurality of owners each having a different group of apparatuses in the building, and periodic inspections are performed for each group of apparatuses. Also in this case, apparatuses whose information is to be provided can be limited for each owner, and thereby management of the apparatuses can be facilitated.

Moreover, for one or more first communication devices (for example, the communication device 20b of the owner 3a and that of the owner 3b), the authentication keys 30a, 30b are previously given, each of which is the authentication key of a different type and is the authentication key that is the master for the apparatus group Ga or Gb consisting of the plurality of apparatuses 1a or 1b. In addition, for one or more second communication devices (for example, the communication device 20b of the user 4), the authentication keys 30b and 30b are previously given, each of which is the authentication key of a different type and is the authentication key that is the slave for the corresponding apparatus group Ga or Gb consisting of the plurality of apparatuses 1a or 1b. Furthermore, the information of each apparatus 1 includes first information (for example, information item C) and second information (for example, information items A and B). The remote processor 2 discloses the first information and the second information of a first apparatus group (apparatus group Ga) to the first communication device (for example, the communication device 20b of the owner 3a) to which the authentication key 30a functioning as the master for the first apparatus group (apparatus group Ga) is given. The remote processor 2 discloses the first information of the first apparatus group (apparatus group Ga) but not the second information thereof to the second communication device (for example, the communication device 20b of the user 4) to which the authentication key 30a functioning as the slave for the first apparatus group (apparatus group Ga) is given. In addition, the remote processor 2 discloses the first information and the second information of a second apparatus group (apparatus group Gb) to the first communication device (for example, the communication device 20b of the owner 3b) to which the authentication key 30b functioning as the master for the second apparatus group (apparatus group Gb) is given. The remote processor 2 discloses the first information of the second apparatus group (apparatus group Gb) but not the second information thereof to the second communication device (for example, the communication device 20b of the user 4) to which the authentication key 30b functioning as the slave for the second apparatus group (apparatus group Gb) is given.

Embodiment 2

Figures 7, 8, 9:
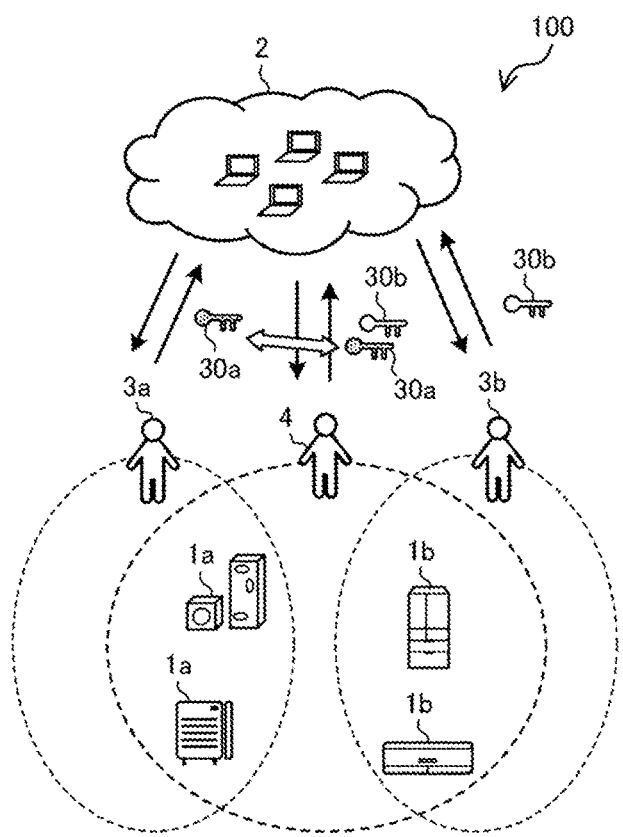
FIG. 7 is a diagram illustrating a relationship between the authentication keys that the user, the information receiver, and the administrator have in the example of FIG. 6.
FIG. 8 is a diagram illustrating a range of the information that can be acquired by using each authentication key in the example of FIG. 6.
FIG. 9 is a diagram illustrating how authentication keys are switched in the apparatus maintenance management system according to Embodiment 3.

FIG. 6 is a diagram illustrating an example of the apparatus maintenance management system according to Embodiment 2. FIG. 7 is a diagram illustrating a relationship between the authentication keys that the user, the information receiver, and the administrator have in the example of FIG. 6. FIG. 8 is a diagram illustrating a range of the information that can be acquired by using each authentication key in the example of FIG. 6. Based on FIGS. 6 to 8, the apparatus maintenance management system 100 according to Embodiment 2 will be described.

The apparatus maintenance management system 100 of Embodiment 2 differs from that of Embodiment 1 in that authentication keys 30 (30a, 30b, 30c) having a master-slave relationship have a hierarchical structure. Because the other features and operations are the same as those of Embodiment 1, their detailed descriptions are omitted here.

As shown in FIGS. 6 and 7, for the same apparatus 1, the administrator 6 has an authentication key 30a functioning as the master, the user 4 has an authentication key 30b functioning as the slave for the administrator 6, and the information receiver 5 has an authentication key 30c functioning as the slave for the user 4. That is, in Embodiment 2, by combining a pair of authentication keys having a master-slave relationship with another pair, the authentication keys 30a, 30b, and 30c form a hierarchical structure having three hierarchical levels. Note that, a hierarchical structure having four or more hierarchical levels may be formed by using three or more pairs of the authentication keys.

In this case, a disclosure level for the authentication key 30a having the top hierarchical level is defined as zero, a disclosure level for the authentication key 30b having a lower hierarchical level is defined as one, and a disclosure level for the authentication key 30c having a further lower hierarchical level is defined as two. As the disclosure level increases, a tighter restriction on information acquisition is imposed. As shown in FIG. 8, a range of the information to be disclosed is defined for each disclosure level in the second restriction table 82. The authentication key 30a having a disclosure level of zero is allowed to acquire all information items A to C. The authentication key 30b having a disclosure level of one is allowed to acquire information items B and C. The authentication key 30c having a disclosure level of two is allowed to acquire only information item C.

Note that, the second restriction table 82 shown in FIG. 8 is a mere example, and the type and the number of the information items (in FIG. 8, information items A to C) for which the disclosure is restricted are not limited to those in FIG. 8. In addition, although, in FIG. 6, a case where the authentication keys 30a, 30b, and 30c having a hierarchical structure are given to the administrator 6, the user 4, and the information receiver 5, respectively, is described, any of the authentication keys may be given to the owner 3 in the same manner.

As described above, in the apparatus maintenance management system 100 according to Embodiment 2, the authentication keys 30a, 30b, and 30c having master-slave relationships form a hierarchical structure having three or more hierarchical levels, each of which has a different disclosure level for the information on at least one of the apparatuses 1.

With this configuration, because a disclosure range can be set for each communication partner in a more specific manner for the information of the same apparatus 1, compared to the conventional system, the chance of unnecessary disclosure of information can be reduced, and thus the security and the confidentiality of information can be improved.

Embodiment 3

Figure 10:
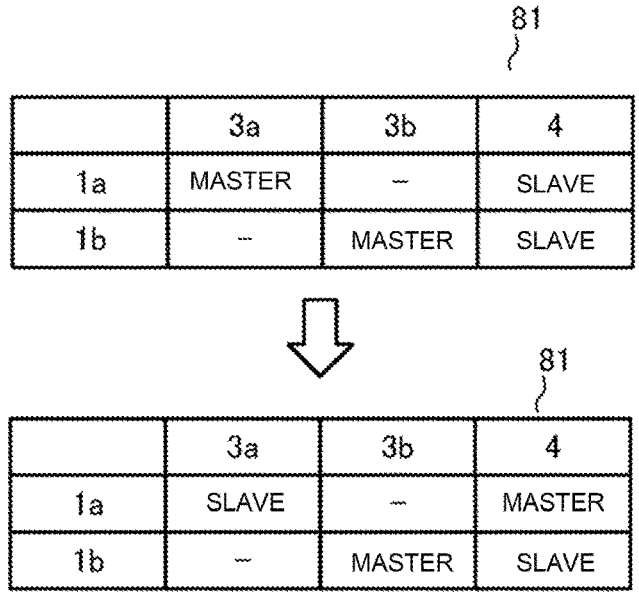
FIG. 10 is a diagram illustrating relationships between the authentication keys that the owners and the user have and the apparatuses before and after the authentication key switching shown in FIG. 9.
Figure 11:
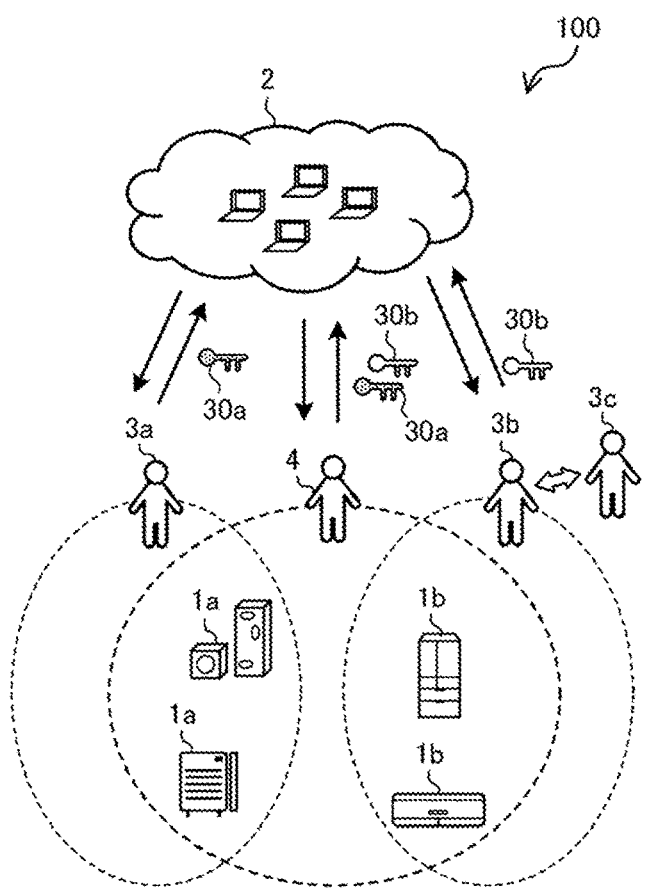
FIG. 11 is a diagram illustrating how an authentication key is replaced in the apparatus maintenance management system according to Embodiment 3.
Figure 12:
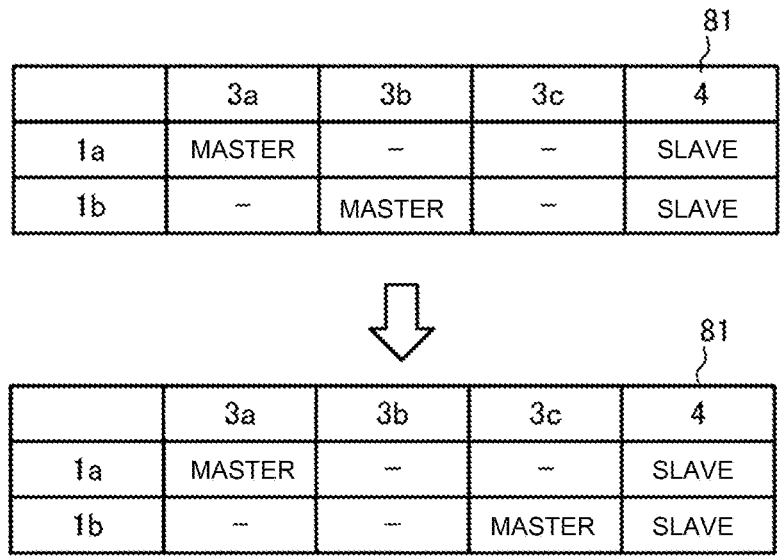
FIG. 12 is a diagram illustrating relationships between the authentication keys that the owners and the user have and the apparatuses before and after the authentication key replacement shown in FIG. 11.

FIG. 9 is a diagram illustrating how authentication keys are switched in the apparatus maintenance management system according to Embodiment 3. FIG. 10 is a diagram illustrating relationships between the authentication keys that the owners and the user have and the apparatuses before and after the authentication key switching shown in FIG. 9. FIG. 11 is a diagram illustrating how an authentication key is replaced in the apparatus maintenance management system according to Embodiment 3. FIG. 12 is a diagram illustrating relationships between the authentication keys that the owners and the user have and the apparatuses before and after the authentication key replacement shown in FIG. 11. Based on FIGS. 9 to 12, the apparatus maintenance management system 100 according to Embodiment 3 will be described.

The apparatus maintenance management system 100 of Embodiment 3 differs from that of Embodiment 1 in that, with a permission from a person who owns an authentication key 30a or 30b functioning as the master, that is the master key owner, at least one of the master key owner and the slave key owner of that authentication key 30a or 30b can be changed. Because the other features are the same as those of Embodiment 1, their detailed descriptions are omitted here.

Among the owner 3, the user 4, the information receiver 5, and the administrator 6 (FIG. 1), the master-slave relationship of the authentication key 30a or 30b can be switched. Here, switching of the master-slave relationship between the authentication keys 30a means that the master key owner and the slave key owner being previously set for the authentication key 30a are switched, as shown in FIG. 9. In the example shown in FIG. 9, switching of the master-slave relationship between the authentication keys 30a is performed. More specifically, as shown in FIG. 10, switching of the master-slave relationship between the owner 3a, who was the master for the apparatus 1a before the switching, and the user 4, who was the slave for the apparatus 1a before the switching, is made in the first restriction table 81 stored in the storage unit 26 (FIG. 3) of the remote processor 2. After the switching, the master for the apparatus 1a is the user 4 and the slave for the apparatus 1a is the owner 3a. When switching of the master-slave relationship between the authentication keys 30a is performed, the first restriction table 81 stored in the storage unit 26 is updated by the communication setting unit 23 of the remote processor 2 (FIG. 3), and the authentication keys 30a corresponding to the master-slave relationship after change are given to people for which the setting has been changed.

Furthermore, the master key owner, who owns the authentication key 30a or 30b functioning as the master, or the slave key owner, who owns the authentication key 30a or 30b functioning as the slave, can be replaced. Here, a replacement of the master key owner means that the master key owner being previously set is replaced with a different person, and a replacement of the slave key owner means that the slave key owner being previously set is replaced with a different person. In the example shown in FIG. 11, the master key owner of the authentication key 30b is replaced. More specifically, as shown in FIG. 12, in the first restriction table 81 stored in the storage unit 26 (FIG. 3) of the remote processor 2, the master of the apparatus 1b is replaced from the owner 3b to another owner 3c. The slave for the apparatus 1b remains the same before and after the replacement. After the replacement of the master key owner of the authentication key 30b, the master of the apparatus 1b is the owner 3c and the slave of the apparatus 1b is the user 4. When the master key owner or the slave key owner of the authentication key 30b is replaced with a different person, the first restriction table 81 stored in the storage unit 26 is updated by the communication setting unit 23 of the remote processor 2 (FIG. 3), and the authentication key 30b corresponding to the master-slave relationship after change is given to the person.

Next, a description will be given of the steps to be performed by the remote processor 2 when the abovementioned change in the communication setting is requested from the outside. Because the other basic operations are the same as those of Embodiment 1, their detailed description are omitted here.

Figure 13:
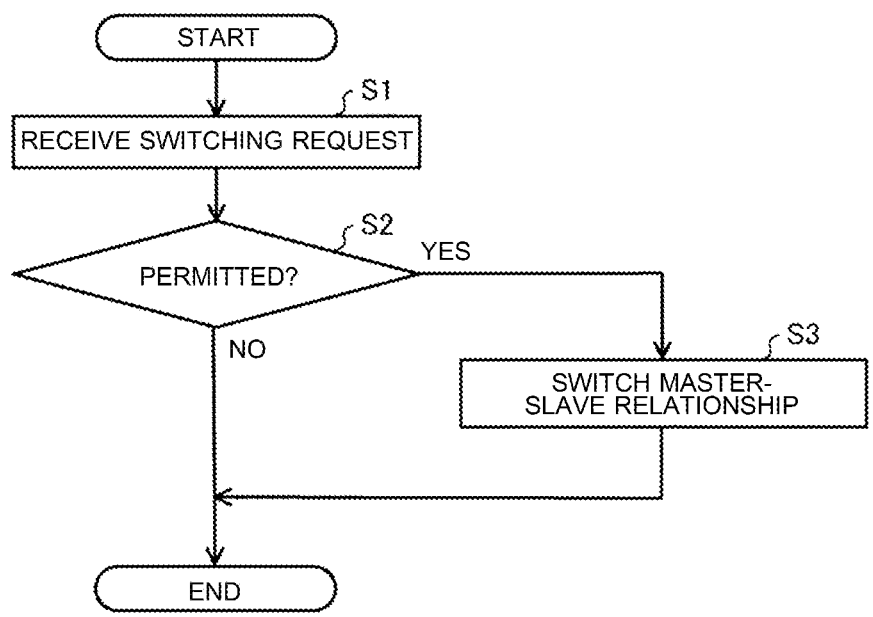
FIG. 13 is a flowchart illustrating processing for a switching request according to Embodiment 3.

FIG. 13 is a flowchart illustrating processing for a switching request according to Embodiment 3. Based on FIG. 13, as well as with reference to FIG. 11, the steps to be performed by the remote processor 2 when a switching request of the authentication keys 30a is received will be described.

When receiving, from the outside (for example, a person who is the slave for the apparatus 1a or another person), a switching request of the master-slave relationship of the apparatus 1a (step S1), the remote processor 2 determines whether or not the person (owner 3) who is the master for the apparatus 1a gives a permission for the switching (step S2). In the determination of step S2, the remote processor 2 transmits the switching request to the person who is the master for the apparatus 1a for which the switching is requested. When receiving a permission of the switching from the person, the remote processor 2 determines that the switching request is permitted (YES in step S2). When the remote processor 2 determines that the switching request is permitted (YES in step S2), the remote processor 2 performs switching of the master-slave relationship between the authentication keys 30a for the apparatus 1a (step S3). At that time, as described above, as well as updating the first restriction table 81 (FIG. 10) stored in the storage unit 26 (FIG. 3), the remote processor 2 issues the authentication keys 30a corresponding to the switching request. Meanwhile, in the determination of step S2, when the remote processor 2 determines that the switching is not permitted (NO in step S2), the remote processor 2 terminates the processing without performing the requested switching. The remote processor 2 may notify the person who transmitted the switching request with the result of permission determination, that is a notice of whether the switching request is permitted or rejected.

Figures 14, 15:
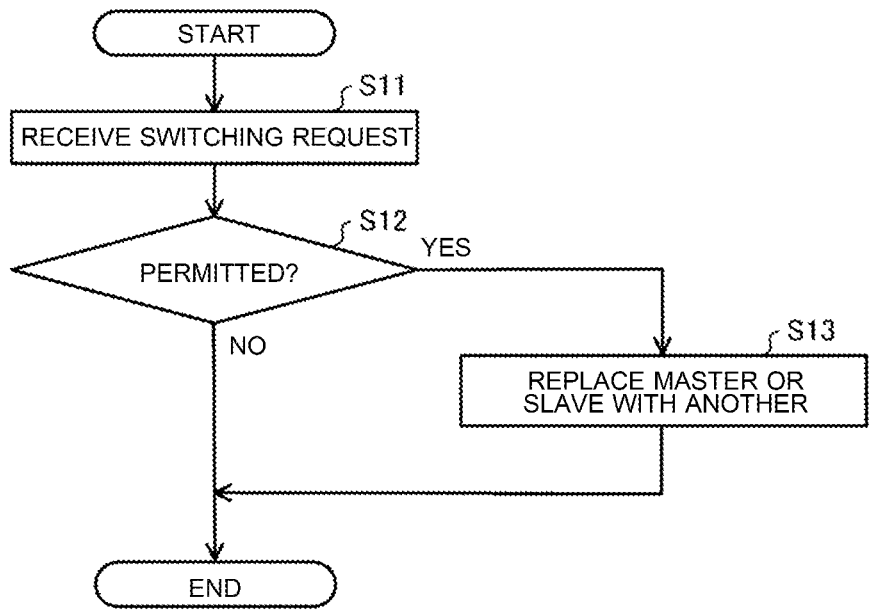
FIG. 14 is a flowchart illustrating processing for a replacement request according to Embodiment 3.
FIG. 15 is a diagram illustrating setting of approval or disapproval for change in the apparatus maintenance management system according to Embodiment 4.

FIG. 14 is a flowchart illustrating processing for a replacement request according to Embodiment 3. Based on FIG. 14, as well as with reference to FIG. 11, the steps to be performed by the remote processor 2 when a replacement request of an authentication key is received will be described.

When receiving a replacement request for replacing the master or the slave for the apparatus 1b (step S11), the remote processor 2 determines whether or not the person who is the master for the apparatus 1b gives a permission for the replacement (step S12). In the determination of step S12, when the sender of the replacement request is the person who is the master for the apparatus 1b (owner 3b), the remote processor 2 determines that the person who is the master for the apparatus 1b gives a permission for the replacement (YES in step S12). When the sender of the replacement request is not the person who is the master for the apparatus 1, the remote processor 2 transmits the replacement request to the person who is the master for the apparatus 1. When receiving a permission of the replacement from the person who is the master for the apparatus 1, the remote processor 2 determines that the replacement request is permitted (YES in step S12). When the remote processor 2 determines that the replacement request is permitted by the person who is the master (YES in step S12), the master or the slave for the apparatus 1 is replaced with a different person (step S13). At that time, as described above, as well as updating the first restriction table 81 stored in the storage unit 26, the remote processor 2 issues the authentication key 30b corresponding to the replacement request. Meanwhile, in a case where the sender of the replacement request is not the person who is the master for the apparatus 1, when the remote processor 2 determines that the replacement is not permitted by the person who is the master (NO in step S12), the remote processor 2 terminates the processing without performing the requested replacement. The remote processor 2 may notify the person who transmitted the replacement request with the result of permission determination, that is a notice of whether the replacement request is permitted or rejected.

As shown in FIGS. 9 and 11, after the authentication key 30a or 30b is changed, the information management unit 24 (FIG. 3) of the remote processor 2 determines a range of the information to be disclosed to each communication partner based on the changed authentication key 30a or 30b. Then, in the determined disclosure range, information of the plurality of apparatuses 1 stored in the storage unit 26 (FIG. 3) of the remote processor 2 is provided to the communication partner.

As described above, in the maintenance system according to Embodiment 3, when a replacement request for replacing the master key owner or the slave key owner being previously set for the authentication key 30b with a different person is permitted by the master key owner, the remote processor 2 issues the authentication key 30b corresponding to the replacement request. Furthermore, when an switching request for switching the master key owner and the slave key owner being previously set for the authentication key 30a is permitted by the master key owner, the remote processor 2 issues the authentication keys 30a corresponding to the switching request.

With this configuration, when more disclosure of information is required than normal, such as when one of the apparatuses 1 is failed, the disclosure range can be extended by a simple operation such as by transmitting an switching request or a replacement request from the communication device 20a or 20b to the master key owner of the authentication key 30 for that apparatus 1. Once the situation is back to normal, the authority level can be restored to the original level, and thus unnecessary leakage of information can be prevented.

Embodiment 4

FIG. 15 is a diagram illustrating setting of approval or disapproval for change in the apparatus maintenance management system according to Embodiment 4. Based on FIG. 15, the apparatus maintenance management system 100 according to Embodiment 4 will be described.

The apparatus maintenance management system 100 of Embodiment 4 differs from that of Embodiment 3 in that determination of whether or not to permit a change request is executed automatically based on a predetermined approval/disapproval setting. Because the other features and operations are the same as those of Embodiment 3, their detailed descriptions are omitted here.

As shown in FIG. 15, a third restriction table 83 in which approval or disapproval for change, such switching and displacement, is defined for each of the apparatus 1a and the apparatus 1b is stored in the storage unit 26 (FIG. 3) of the remote processor 2. In the example shown in FIG. 15, setting for the apparatus 1a is made so that a switching request and a replacement request are both rejected. Meanwhile, setting for the apparatus 1b is made so that a switching request and a replacement request are both permitted.

When the remote processor 2 of Embodiment 4 performs the determination of step S2 shown in FIG. 13 or the determination of step S12 shown in FIG. 14, the determination is executed automatically based on the predetermined approval/disapproval setting.

As described above, in the apparatus maintenance management system 100 according to Embodiment 4, approval/disapproval for replacement request for replacing the master key owner or the slave key owner of the authentication key 30 and approval/disapproval for switching request for switching the master key owner and the slave key are set in advance for each apparatus 1 in the remote processor 2. When receiving a replacement request for replacing the master or the slave of the apparatus 1b for which replacement request is permitted, the remote processor 2 issues the authentication key 30 corresponding to the replacement request. In addition, when receiving a switching request for switching the master-slave relationship for the apparatus 1b for which switching request is permitted, the remote processor 2 issues the authentication keys 30 corresponding to the switching request. Consequently, the remote processor 2 does not need to inquire of the master of each apparatus 1 whether or not to permit a change request, and the master of each apparatus 1 does not need to respond to each change request. Thus, a communication load and a workload can be reduced.

Embodiment 5

Figure 16:
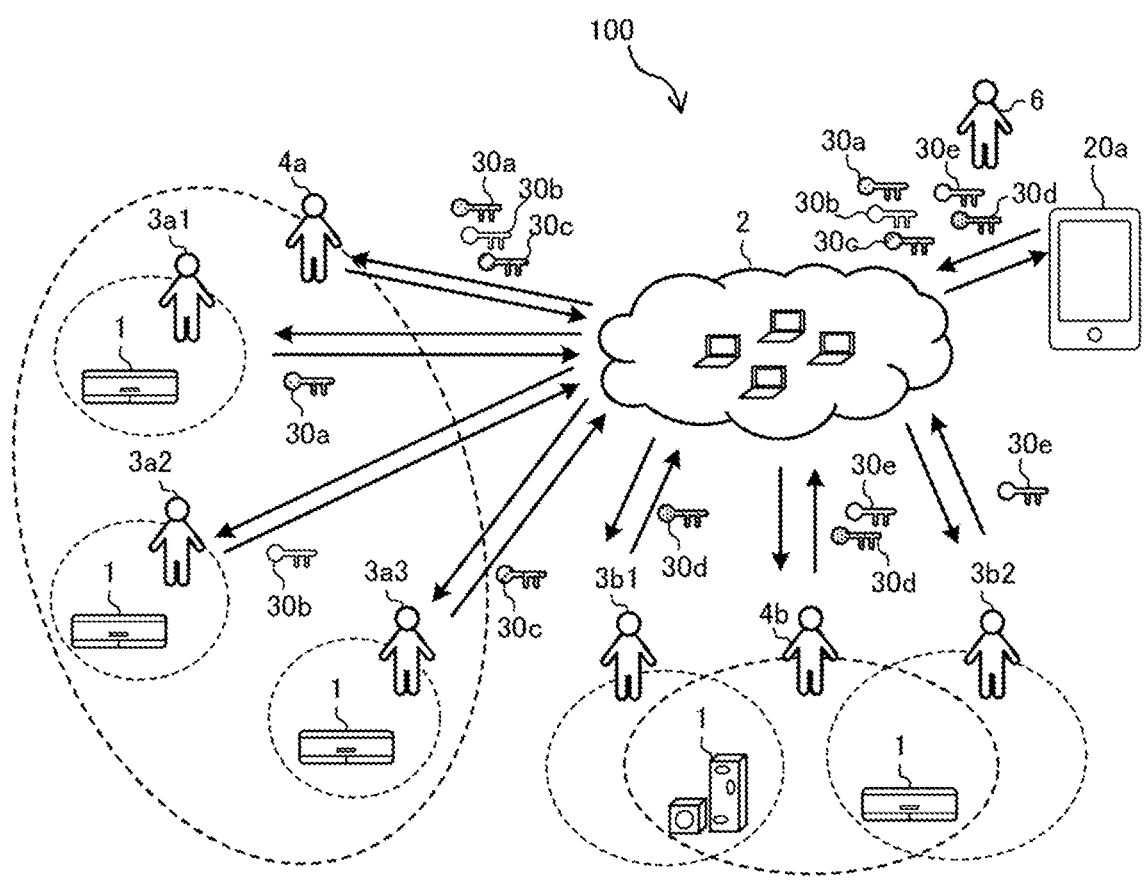
FIG. 16 is a diagram illustrating an example of the apparatus maintenance management system according to Embodiment 5.
Figures 17, 18:
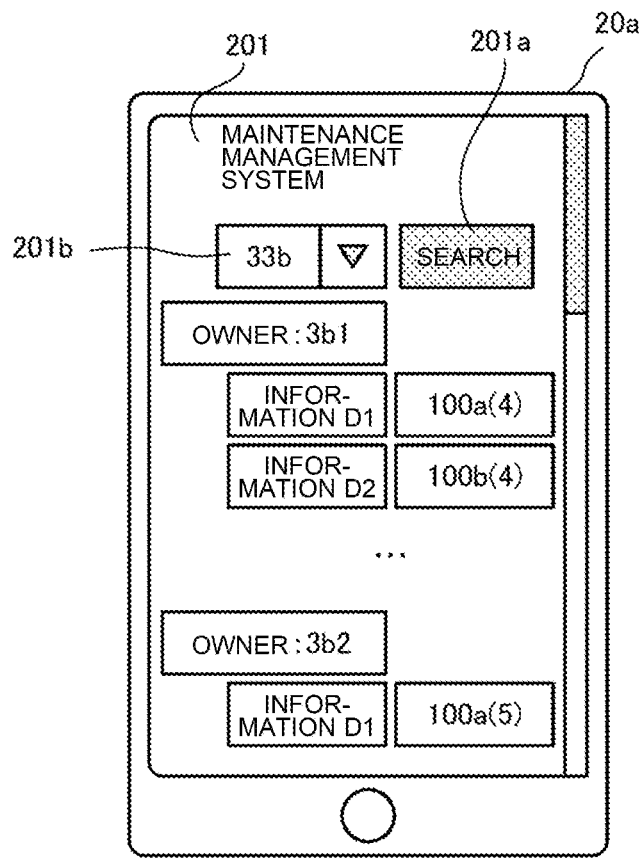
FIG. 17 is a diagram illustrating an example of a visualizing means in the apparatus maintenance management system of FIG. 16.
FIG. 18 is a diagram illustrating a relationship among search codes, authentication keys, and various items of information in the apparatus maintenance management system of FIG. 16.

FIG. 16 is a diagram illustrating an example of the apparatus maintenance management system according to Embodiment 5. FIG. 17 is a diagram illustrating an example of a visualizing means in the apparatus maintenance management system of FIG. 16. FIG. 18 is a diagram illustrating a relationship among search codes, authentication keys, and various pieces of information in the apparatus maintenance management system of FIG. 16. Based on FIGS. 16 to 18, the apparatus maintenance management system 100 according to Embodiment 5 will be described.

The apparatus maintenance management system 100 of Embodiment 5 differs from that of Embodiment 1 in that one or more search codes SS1, SS2 can be assigned to each authentication key and in that a notifying means for notifying the administrator 6 of an information group relating to the search codes SS1, SS2 is provided. Because the other features and operations are the same as those of Embodiment 1, their detailed descriptions are omitted here.

As shown in FIG. 16, the apparatus maintenance management system 100 includes the communication device 20a (for example, a smartphone) that the administrator 6 of the remote processor 2 owns, as a notifying means for notifying the administrator 6 of a search result. Hereinafter, the communication device 20a owned by the administrator 6 may be referred to as a communication device for management to distinguish it from the communication devices 20b of the users 4 and other people. The communication device 20a is configured to, through communication, acquire information on the plurality of apparatuses 1 accumulated in the remote processor 2, and inform the administrator 6 of the information. As shown in FIG. 17, the communication device 20a includes a display screen 201 displaying information. Note that, the communication device 20a is not limited to the abovementioned smartphone, and any device can be used as long as the device has a function of audibly or visually notifying the administrator 6 of the information acquired from the remote processor 2.

In the example shown in FIG. 16, the administrator 6 has authentication keys 30a to 30e functioning as the master. A user 4a has authentication keys 30a to 30c functioning as the master, and a user 4b has authentication keys 30d and 30e functioning as the master. Note that, for convenience of explanation, suppose that there is no master-slave relationship between the administrator 6 and the user 4a, 4b, and that the administrator 6 has the same authentication keys as the authentication keys 30a to 30c of the user 4a and the same authentication keys as the authentication key 30d and 30e of the user 4b. In addition, the user 4a uses three apparatuses 1, each owned by a different owner 3a1, 3a2, or 3a3. Furthermore, the user 4b uses two apparatuses 1, each owned by a different owner 3b1 or 3b2. The owners 3 (3a1, 3a2, 3a3, 3b1, and 3b2) each have the authentication key 30 (30a, 30b, 30c, 30d, or 30e) functioning as the slave for his own apparatus 1. Thus, in the example shown in FIG. 16, the authentication keys 30a to 30e correspond one-to-one with the owners 3a1, 3a2, 3a3, 3b1, and 3b2.

The storage unit 26 (FIG. 3) of the remote processor 2 stores a correspondence table 84 including the authentication keys 30a to 30e, one or more search codes SS1, SS2 associated with each of the authentication keys 30a to 30e, the owners 3, and a plurality of information items D1 and D2 on the apparatuses 1 owned by the owners 3. In the example shown in FIG. 18, two search codes SS1 and SS2 are used, and the search code SS1 is set for each of the users 4. More specifically, for the three authentication keys 30a to 30c owned by the user 4a, the same search code SS1 (for example, 33a) is assigned, and for the two authentication keys 30d and 30e owned by the user 4b, the same search code SS1 (for example, 33b) is assigned. In addition, the search code SS2 is set for each of the owners 3.

The search codes SS1 and SS2 each consist of an alphanumeric character string as shown above, or an alphanumeric character string including symbols. Note that, as the search codes SS1 and SS2, the information on each authentication key 30 itself or the information of the owner 3 of the authentication key 30 may be used. Furthermore, when no data is present for the information item D1 or D2 of an apparatus 1 relating to an authentication key 30, blank may be returned as a search result.

Next, a description will be given of the information to be displayed on the display screen 201 (FIG. 17) of the communication device 20a when the administrator 6 having the authentication keys 30a to 30e searches information from his own communication device 20a by using a string 33b as the search code SS1. When the administrator 6 selects or enters the search code SS1 on the communication device 20a and presses a search button 201a, a search request for requesting transmission of the information corresponding to the selected search code SS1 (33b in FIG. 17) is transmitted to the remote processor 2 (FIG. 16). The remote processor 2 extracts, as a search result, the information from the storage unit 26 (FIG. 3) based on the search code SS1 included in the search request and on the authentication keys 30a to 30e that the communication partner (administrator 6) has, and then transmits the search result. The communication device 20a receives the search result from the remote processor 2, and displays the search result on the display screen 201 of the communication device 20a, as shown in FIG. 17. More specifically, on the display screen 201 of the communication device 20a, the selected search code SS1 (33b in FIG. 17), the authentication keys 30 corresponding to the search code SS1, the information of the owner 3 corresponding to each of the authentication keys 30, and the information items D1 and D2 of the apparatus 1 corresponding to each of the authentication keys 30.

Note that, the search codes SS1 and SS2 may be used for a partial match search, in addition to an exact match search.

As the result of search performed by the administrator 6 based on the search code SS1 (33*b*), the information of the two apparatuses 1 corresponding to the authentication keys 30*d* and 30*e* owned by the user 4*b*, among the five apparatuses 1 corresponding to the authentication keys 30*a* to 30*e* owned by the administrator 6, is displayed on the display screen 201, as shown in FIG. 17. That is, the owner 3*b*1 of the apparatus 1 corresponding to the authentication key 30*d*, and the information item D1 (100*a*(4)) and the information item D2 (100*b*(4)) of the apparatus re displayed. In addition, the owner 3*b*2 of the apparatus 1 corresponding to the authentication key 30*e*, and the information item D1 (100*ab*(5)) and the information item D2 (100*b*(5)) of the apparatus 1 are displayed.

Note that, the items to be displayed and the number of the items are not limited to the example of FIG. 17. A search box 201*b* may be entered by displaying a list of searchable items and selecting one therefrom, or by manually.

Note that, when means for notifying by voice is used, search items may be entered by voice recognition. In addition, a search result may be informed by reading it aloud, instead of displaying it on the display screen 201. In this case, the language to be used is not limited to Japanese.

Furthermore, as shown in FIG. 16, the user 4*a* can acquire the information related to the authentication keys 30*a* to 30*c* by performing communication with the remote processor 2 by his own communication device 20*b* (not shown) by using the authentication keys 30*a* to 30*c* functioning as a mater. More specifically, about the three apparatuses 1 that the user 4*a* is using, the user 4*a* can acquire the information item D1 (100*a*(1), 100*a*(2), and 100*a*(3)), the information item D2 (100*b*(1), 100*b*(2), and 100*b*(3)), and the information on the owners 3 (3*a*1, 3*a*2, and 3*a*3).

The user 4*b* can acquire the information related to the authentication keys 30*d* and 30*e* by performing communication with the remote processor 2 by his own communication device 20*b* (not shown) by using the authentication keys 30*d* and 30*e* functioning as the master. More specifically, about the two apparatuses 1 that the user 4*b* is using, the user 4*b* can acquire the information item D1 (100*a*(4), and 100*a*(5)), the information item D2 (100*b*(4), 100*b*(5)), and the information on the owners 3 (3*b*1, and 3*b*2).

Moreover, the user 4*a* can search information by his own communication device 20*b* (not shown) by using the search code SS2 to display, on the communication device 20*b* (not shown), only the information related to a specific authentication key (for example, the authentication key 30*a*) among the authentication keys 30*a* to 30*c* owned by the users. Moreover, the user 4*b* can search information by his own communication device 20*b* (not shown) by using the search code SS2 to display, on the communication device 20*b* (not shown), only the information related to a specific authentication key among the authentication keys 30*d* to 30*e* owned by the users.

By using the authentication key 30 (30*a*, 30*b*, 30*c*, 30*d*, or 30*e*) functioning as the slave, each of the owners 3 (3*a*1, 3*a*2, 3*a*3, 3*b*1, and 3*b*2) can acquire the information related to the authentication key 30 by performing communication with the remote processor 2 by his own communication device 20*b* (not shown). For example, the owner 3*a*1 can acquire the information item D1 (100*a*(1)) and the information item D2 (100*b*(1)) of his own apparatus 1.

As described above, the apparatus maintenance management system 100 according to Embodiment 5 includes the communication device for management (communication device 20*a*) configured to acquire information from the remote processor 2 and notify the information. The remote processor 2 stores one or more search codes SS1, SS2 associated with each of the authentication keys 30*a* and 30*b*. When the search codes SS1 and SS2 are entered to the communication device 20*a*, the communication device 20*a* notifies the user of the authentication keys 30 associated with the search codes SS1 and SS2 and the information group (for example, the information item D1 and the information item D2) including the information related to the authentication keys 30, together with the search codes SS1 and SS2.

With this configuration, because the information can be searched from a huge data group and the searched information can be notified, necessary information can be obtained easily without increasing a workload. Thus, convenience in the management and maintenance of the apparatuses 1 can be enhanced.

Note that, various combinations of the embodiments, and modifications and omissions in the embodiments are allowed, as appropriate.

The invention claimed is:

1. An apparatus maintenance management system comprising:
   a plurality of apparatuses each configured to transmit information on its own operation and information on a presence or absence of an abnormality; and
   a remote processor configured to acquire and store the information of each of the apparatuses,
   the remote processor being configured to
      restrict communication by using authentication keys of at least one type having a master-slave relationship,
      perform communication with, as a communication partner, each of a first communication device to which one of authentication keys that functions as a master for at least one of the apparatuses is given in advance and a second communication device to which another one of the authentication keys that functions as a slave for the first communication device is given in advance, and
      determine a range of the information to be provided to the communication partner according to the type and the master-slave relationship of the authentication key that the communication partner has, when performing communication.

2. The apparatus maintenance management system of claim 1, wherein
   the first communication device and the second communication device include at least two communication devices being a communication device owned by an administrator of the remote processor, a communication device owned by an owner of the some apparatuses, a communication device owned by a user of the some apparatuses, and a communication device owned by a maintenance provider of the some apparatuses.

3. The apparatus maintenance management system of claim 1, wherein
   the authentication keys having a master-slave relationship form a hierarchical structure having three or more hierarchical levels, each having a different disclosure level for the information of the some apparatuses.

4. The apparatus maintenance management system of claim 1, wherein
   the remote processor is configured to,
   when a replacement request for replacing a master key owner or a slave key owner being set in advance for the authentication keys is permitted by the master key owner, issue the authentication key corresponding to a replacement request, and when a switching request for switching a master key owner and a slave key owner being set in advance for the authentication keys is permitted by the master key owner, issue the authentication keys corresponding to the switching request.

5. The apparatus maintenance management system of claim 1, wherein approval/disapproval for a replacement request for replacing a master key owner or a slave key owner of the authentication keys with another person and for a switching request for switching the master key owner and the slave key owner are set in advance for each of the apparatuses, the remote processor is configured to issue the authentication key according to the replacement request when the replacement request is made for the apparatus for which the replacement request is permitted, and issue the authentication keys according to the switching request when the switching request is made for the apparatus for which the switching request is permitted.

6. The apparatus maintenance management system of claim 1, further comprising:

a communication device for management configured to acquire the information from the remote processor and perform notification thereof, wherein a search code of at least one type is associated with each of the authentication keys and is stored in the remote processor, and the communication device for management is configured to perform, when the search code is entered, notification of an information group including, together with the search code, the authentication key corresponding to the search code, and the information related to the authentication key.

7. The apparatus maintenance management system of claim 1, wherein for one or more first communication devices, the authentication keys are previously given, each of which is the authentication key of a different type and is the authentication key that is the master for a different apparatus group among the plurality of the apparatuses, for one or more second communication devices, the authentication keys are previously given, each of which is the authentication key of a different type and is the authentication key that is the slave for a different apparatus group among the plurality of apparatuses, and the information of each of the apparatuses includes first information and second information, and wherein the remote processor is configured to, when communicating with each of the first and second communication devices, disclose the first information and the second information of the first apparatus group to the first communication device to which the authentication key functioning as the master for the first apparatus group is given, disclose the first information of the first apparatus group but not the second information thereof to the second communication device to which the authentication key functioning as the slave for the first apparatus group is given, disclose the first information and the second information of the second apparatus group to the first communication device to which the authentication key functioning as the master for the second apparatus group is given, and disclose the first information of the second apparatus group but not the second information thereof to the second communication device to which the authentication key functioning as the slave for the second apparatus group is given.

* * * * *